(12) United States Patent
Medina Sanchez (10) Patent No.: US 8,199,048 B1
(45) Date of Patent: Jun. 12, 2012

(54) CALIBRATION TECHNIQUE FOR PHASED ARRAY ANTENNAS

(75) Inventor: Rafael H. Medina Sanchez, Amherst, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 12/968,446

(22) Filed: Dec. 15, 2010

(51) Int. Cl.
*G01S 7/40* (2006.01)
(52) U.S. Cl. ......................................... 342/174; 375/224
(58) Field of Classification Search .................. 342/174; 375/224
See application file for complete search history.

(56) References Cited

U.S. PATENT DOCUMENTS 6,127,966 A * 10/2000 Erhage .......................... 342/174
2008/0165049 A1* 7/2008 Wakayama et al. ............. 342/91
* cited by examiner

*Primary Examiner* — Timothy A Brainard (74) *Attorney, Agent, or Firm* — Brian M. Dingman; Mirick, O'Connell, DeMallie & Lougee, LLP (57) ABSTRACT

A method for calibrating a phased-array antenna that involves transmitting a signal from a transmitting element, and sequentially receiving the transmitted signal at two receiving elements each spaced a first distance from the transmitting element. This step is then repeated one or more times, but transmitting from a different transmitting element in each repetition of the step, until each element being calibrated has received at least one transmission. Then, the first distance is changed to a second distance, and the steps are repeated one or more times to gather additional measurements. These measurements allow the determination from the received signals of two separate element mutual coupling ratios, one ratio for one subset of the elements being calibrated and the other for a second subset comprising the remaining elements being calibrated. Next, at least four additional transmissions and receptions are made via two transmissions each from two transmitting elements comprising one element of each subset, and the reception of transmissions from each of these two transmitting elements by each of two receiving elements, the two receiving elements being different elements than the two transmitting elements. From these last measurements a complex calibration ratio for all of the elements being calibrated with respect to a single element is determined. For calibration in the transmit mode, this same procedure is followed, but the transmissions become receptions and the receptions become transmissions.

16 Claims, 6 Drawing Sheets

CALIBRATION TECHNIQUE FOR PHASED ARRAY ANTENNAS

GOVERNMENT RIGHTS

This invention was made with government support under grant number EEC-0313747 awarded by the National Science Foundation. The government has certain rights in the invention.

FIELD

This invention relates to a method for calibrating phased array antennas.

BACKGROUND

Active phased array antennas are composed of many radiating elements, each with phase and amplitude control. Beams are formed by weighing the amplitude and shifting the phase of the signal emitted from each radiating element, to provide constructive/destructive interference so as to steer the beams in the desired direction. Planar phased array antennas can electronically steer the beam in azimuth and the elevation plane and provide faster beam steering rates than a mechanical steering system.

A phased array antenna must be calibrated in the factory before being deployed in the field in order to ensure that the radiation pattern of the antenna meets the antenna performance specification. The calibration is typically performed in a near-field antenna range; during this process a sampling probe is positioned in front each radiating element, with that element in either transmit or receive mode and the remaining array elements terminated in matched loads. The amplitude and phase of each radiating element is accurately measured through each T/R module amplitude and phase state. This data is used to develop correction factors that minimize the element-to-element random errors. The desired radiation pattern is then achieved by adjusting the T/R module amplitudes and phases as indicated by the corrections factors.

Solid-state radars for weather application require the phased array antennas to be deployed for a long period of time. The performance of the antennas may deteriorate over time as a result of changes in the solid-state devices. In addition, failed T/R modules must be replaced in the field. As a result, the T/R modules must be re-calibrated to correct the component drift or the module replacement. In order to avoid the radars being taken out of service for a long time, a self-calibration is required.

Several techniques of self-calibration or auto-calibration for active phased array antennas have been proposed and implemented. These have an internal calibration source and use mutual coupling measurements among array elements to determine the element-to-element errors. Some such calibration techniques use the inherent array mutual coupling to transmit and receive signals between pairs of adjacent elements in the array, while all other elements are turned off and terminated in matched loads.

Another calibration technique employs a small number of dedicated passive calibration elements to calibrate the antenna. The array is split into several blocks, each having a single passive calibration element near its center. The calibration is achieved by sequentially measuring the mutual coupling between each passive element and a selected group of active array elements belonging to adjacent blocks. However, this technique is not suitable for small array antennas, because a small number of dedicated passive elements for calibration would degrade the sidelobe level and antenna gain.

SUMMARY

This disclosure relates to calibration techniques for array antennas, without the use of a near-field antenna range. The techniques use mutual coupling measurements between array elements to characterize the relative amplitude and phase between them. The measurements can be made between pairs of adjacent or non-adjacent elements. By using the mutual coupling measurements between non-adjacent elements, arrays with high power modules can be calibrated. Simulated results of a linear array of columns of elements in an electromagnetic simulator are used herein to demonstrate a calibration technique and predict the array patterns.

Theory
Array Aperture Distribution and Radiation Pattern

Figure 1:
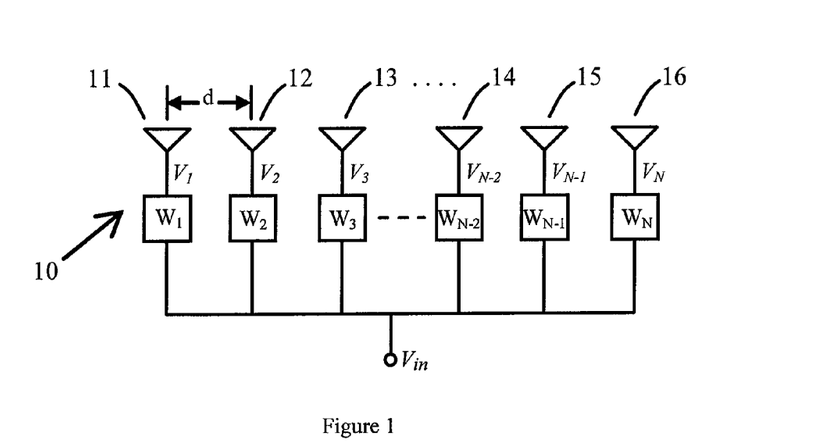
FIG. 1 is a schematic diagram of an N element linear array.

Consider a uniform N-element linear array of uniformly-spaced identical elements, such as array 10, FIG. 1, with elements 11, 12, 13 . . . 14, 15 and 16. For large arrays, the edge diffraction effects can be neglected and the mutual coupling can be assumed uniform, such that the element radiation patterns can be considered approximately identical. Under this assumption, the far-field vector radiation pattern is expressed as $$E(\theta, \phi) = e_a(\theta, \phi) \sum_{n=1}^{N} V_n e^{j\frac{2\pi}{\lambda} nd\sin\theta} \tag{1}$$

where, $e_a$ is the active element radiation pattern, $V_n$ is the excitation of the nth element, $\lambda$ is the wavelength, and d is the spacing between elements. The excitation function for each array element is expressed as $$V_n = w_n(i) u_n^T V_{in} \tag{2}$$

where, $w_n(i)$ is the module insertion attenuation and phase for its ith complex state, $u_n^T$ represents the combined effects in transmit mode of attenuation and phase delay in the power dividers/combiners, RF cables, connectors, and the insertion loss and phase due to attenuators and phase shifters when they are set to their initial state. $V_{in}$ is the excitation at the beamformer input.

Due to intentional or unintentional hardware differences in the array, $u_1^T \neq u_2^T \neq \ldots u_N^T$. These differences affect the relative gain and phase between array elements. The random variations in $u_n$ must be compensated with the attenuators and phase shifters such that the desired excitation can be implemented. In a uniform linear array the relative errors between elements can be determined by comparing the excitation functions. For example, comparing the first and nth element excitation, $$w_1(i_1) u_1^T V_{in} = w_n(i_n) u_n^T V_{in} \tag{3}$$

In particular, assuming the first module is set in the zero state, $i_1=0$, by definition, $w_1(0)=1$, then solving (3) for $w_n(i_n)$ yields $$w_n(i_n) = \frac{u_1^T}{u_n^T} = C_{1,n}^T, n = 2, 3, \ldots, N. \tag{4}$$

The quantity $C_{1,n}^T$ is the complex calibration ratio used to align the nth element with respect to the first element. This ratio contains information about the relative amplitude and phase between the first and nth element. Hence, if $C_{1,n}$ is known, the linear array can be calibrated for uniform distribution by using (4). However, for any array aperture distribution with complex excitation $A_n$, the desired element excitation can be achieved when the nth array module is set to some state $i_n$ such that $$w_n(i_n) = C_{1,n}{}^m A_n, n=1,2,3,\ldots,N; m=T,R \quad (5)$$

The array self-calibration procedure is used to determine the complex calibration ratios using mutual coupling measurements between array elements and permit the desired array excitation $V_n$ to be implemented.

This invention features a method for calibrating array elements of a phased array antenna, comprising transmitting a signal from a transmitting element, and sequentially receiving the transmitted signal at two receiving elements each spaced a first distance from the transmitting element, repeating the first step one or more times, transmitting from a different transmitting element in each repetition of the step, until each element being calibrated has received at least one transmission, changing the first distance to a second distance and repeating the first two steps at this second distance for at least some of the elements, determining from the received signals of the first three steps two element mutual coupling ratios, one ratio for one subset of the elements being calibrated and the other for a second subset comprising the remaining elements being calibrated, making at least four additional transmissions and receptions via two transmissions each from two transmitting elements comprising one element of each subset, and the reception of transmissions from each of these two transmitting elements by each of two receiving elements, the two receiving elements being different elements than the two transmitting elements, and determining from the received signals of the previous step a complex calibration ratio for all of the elements being calibrated with respect to a single element.

The elements may be regularly spaced. The first distance may be at least twice the distance between elements. The second distance may be at least three times the distance between elements. The first distance may be three times the distance between elements and the second distance may be four times the distance between elements. The first distance may be less than the second distance. The second distance may be greater than the first distance by the amount of the distance between elements.

There may be p spacing elements between the transmitting element and the receiving elements, and the third step may comprise at least 2(p+1) transmissions and receptions. The antenna may comprise a two-dimensional lattice of elements. The lattice orientation may be either square, rectangular, rhombic or parallelogram. The elements being calibrated may comprise a linear sub-array. The method may further comprise separately conducting the described method on a plurality of sub-arrays that together include each active element of the two-dimensional lattice.

The method may further comprise sequentially transmitting a signal from two transmitting elements each spaced a first distance from a receiving element that receives the two transmitted signals, repeating this step one or more times, receiving at a different receiving element in each repetition of the step, until each element being calibrated has transmitted at least once, changing the first distance to a second distance and repeating the two previous steps at this second distance for at least some of the elements, determining from the transmitted signals of the three previous steps two element mutual coupling ratios, one ratio for one subset of the elements being calibrated and the other for a second subset comprising the remaining elements being calibrated, making at least four additional transmissions and receptions via two receptions each by two receiving elements comprising one element of each subset, and the transmission of transmissions from each of two transmitting elements, the two receiving elements being different elements than the two transmitting elements and determining from transmitted signals a complex calibration ratio for all of the elements being calibrated with respect to a single element.

DESCRIPTION OF EMBODIMENTS

The calibration techniques or methods may be accomplished by methods of calibrating array elements of a phased array antenna. The methods (e.g., for calibration in the receive mode) involve transmitting a signal from a transmitting element, and sequentially receiving the transmitted signal at two receiving elements each spaced a first distance from the transmitting element. This step is then repeated one or more times, but transmitting from a different transmitting element in each repetition of the step, until each element being calibrated has received at least one transmission. Then, the first distance is changed to a second distance, and the steps are repeated to gather additional measurements. These measurements allow the determination from the received signals of two separate element mutual coupling ratios, one ratio for one subset of the elements being calibrated and the other for a second subset comprising the remaining elements being calibrated. Next, at least four additional transmissions and receptions are made via two transmissions each from two transmitting elements comprising one element of each subset, and the reception of transmissions from each of these two transmitting elements by each of two receiving elements, the two receiving elements being different elements than the two transmitting elements. From these last measurements a complex calibration ratio for all of the elements being calibrated with respect to a single element is determined.

For calibration in the transmit mode, this same procedure is followed, but the transmissions become receptions, and the receptions become transmissions.

Following is a description of one embodiment of the calibration method. This is meant as an illustration of the invention, not a limitation of the invention.

Figure 2:
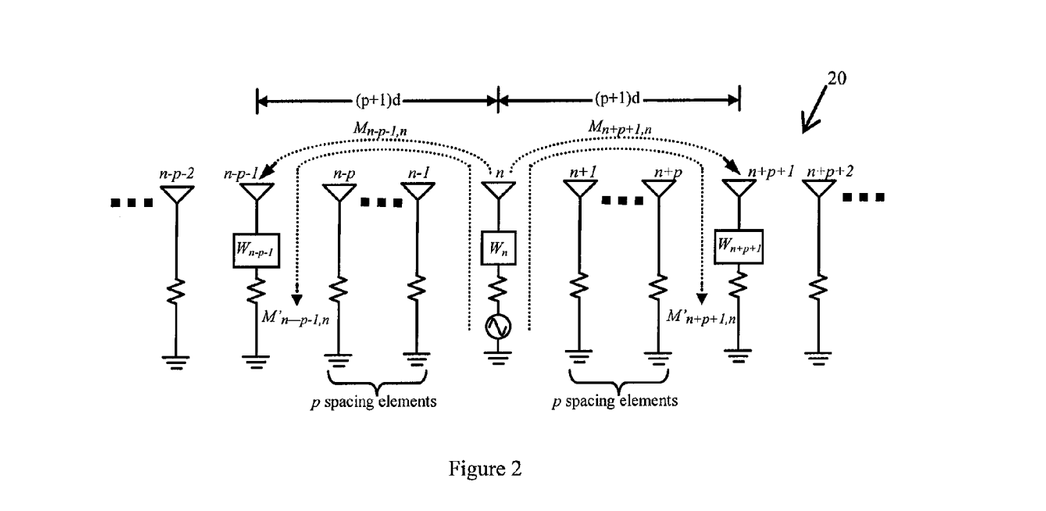
FIG. 2 is a schematic diagram comparing free space mutual coupling and measured mutual coupling.

Mutual coupling effects are always present among radiating elements of any array antenna. The coupling amount depends on element separations and relative orientations. To measure the coupling it is necessary that the system have the ability to transmit with one element and simultaneously receive with another element, which is achieved by using two separate beamforming networks. The transfer function of the system (the ratio of the received to transmitted signals) is called the mutual coupling. The mutual coupling measurements between two elements include the combined effects of the power combiner/divider, RF cables, connectors, T/R modules and the free space mutual coupling. This can be seen in linear array 20 shown in FIG. 2, where M denotes free space mutual coupling and M' is the measured transfer function (the prime mark is used herein to denote measured quantities, or quantities calculated directly from measured quantities). In particular, the transfer functions when transmitting from the nth element and receiving first with the element (n−p−1) and then with the element (n+p+1) are determined by the follow expressions $$M'^R_{n-p-1,n} = w^R_{n-p-1} u^R_{n-p-1} M_{n-p-1,n} w^T_n u^T_n \quad (6.a)$$

$$M'^R_{n+p+1,n} = w^R_{n+p+1} u^R_{n+p+1} M_{n+p+1,n} w^T_n u^T_n \quad (6.b)$$

where, p is the number of spacing elements between the transmit and receive elements. In a large uniform one-dimensional or two-dimensional array antenna made with good tolerances, the free space mutual coupling can be assumed the same for all pairs of equidistant elements from a central element, $M_{n-p-1,n} = M_{n+p+1,n}$. However, due to hardware differences, the measured mutual coupling will not be equal, $M'^R_{n-p-1,n} \neq M'^R_{n+p+1,n}$. Since the transmitting element n is common to receiving elements (n−p−1) and (n+p+1), any differences in $M'^R_{n-p-1,n}$ and $M'^R_{n+p+1,n}$ are due differences in the signal paths at the elements (n−p−1) and (n+p+1) alone. The gain and phase differences in the quantities $M^{R'}_{n-p-1,n}$ and $M^{R'}_{n+p+1,n}$ can be determined as $$C'^R_{n-p-1,n+p+1} = \frac{M'^R_{n-p-1,n}}{M'^R_{n+p+1,n}} = \frac{w^R_{n-p-1}(i_{n-p-1})u^R_{n-p-1}}{w^R_{n+p+1}(i_{n+p+1})u^R_{n+p+1}} \quad (7)$$

In particular, if the measurements are made in zero state of each TR module, $i_{n-p-1} = i_{n+p+1} = 0$, then (7) reduces to $$C'^R_{n-p-1,n+p+1}(0) = \frac{u^R_{n-p-1}}{u^R_{n+p+1}}; \quad \begin{array}{l} \text{for any } p = 0, 1, 2, \ldots, \text{floor}(N/4) - 1 \\ n = p+2, p+3, \ldots N/2 + 4 \end{array} \quad (8)$$

This is the calibration ratio to align the element (n+p+1) with respect to the element (n−p−1).

The maximum number of spacing elements (p) is limited to floor(N/4)−1; any spacing beyond that number will not produce enough data to calibrate the array (floor and ceil as used herein are rounding functions in the MatLab® software that was used for these calculations. The software is available from The Mathworks, Inc., Natick, Mass., USA). When the above concept is applied to the overall array, N−2(p+1) ratios for 2(p+1) interleaved sub-arrays are obtained. The interleaved sub-arrays are sets of elements that can be calibrated with respect to each other.

Figure 3:
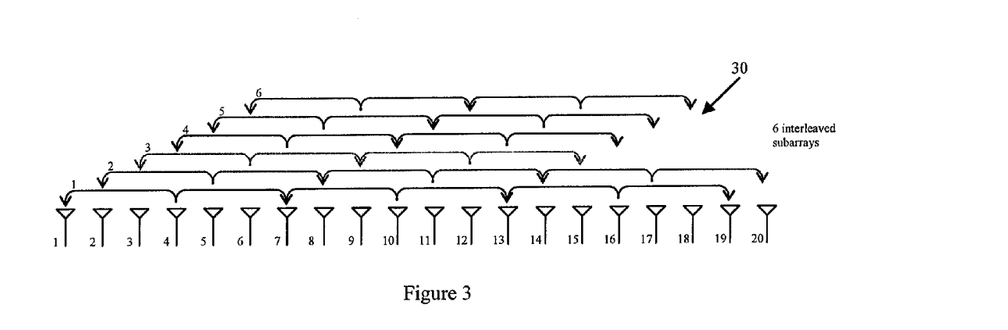
FIG. 3 is an illustration of mutual coupling measurements and interleaved sub-arrays for a twenty-element linear array and two spacing elements.

FIG. 3 shows the mutual coupling measurements that are taken in a linear array 30 of twenty elements, with two spacing elements. In FIG. 3 the measurements are indicated by a series of arrows. For example, the first series of measurements are aimed at determining the calibration ratios for the first interleaved sub-array (labeled on the left side with a "1"), $C_{1,7}, C_{7,13}, C_{13,19}$. These measurements involve transmitting from element 4 and receiving this signal at elements 1 and 7, then transmitting from element 10 and receiving this signal at elements 7 and 13, then transmitting from element 16 and receiving this signal at elements 13 and 19. The second series of measurements (transmitting from elements 5, 11 and 17) generate the calibration ratios for the second interleaved sub-array (labeled with a "2"), $C_{2,8}, C_{8,14}, C_{14,20}$, and so on. The result is fourteen calibration ratios and six interleaved sub-arrays (labeled 1-6 in FIG. 3). Each sub-array is composed of only odd or even array elements.

The elements of each interleaved sub-array can be calibrated and referenced to its first element as $$m = 1, 2, 3 \ldots, 2(p+1) \quad (9)$$

$$C'^R_{m,n}(0) = \prod_i^n C'^R_{i,i+2(p+1)}(0); \quad n = m + 2(p+1), m + 4(p+1),$$

$$m + 6(p+1), \ldots, 2(p+1)\text{floor}\left(\frac{N-m}{2(p+1)}\right) + m$$

$$i = m, m + 2(p+1), m + 4(p+1), \ldots, n - 2(p+1)$$

In this way, the 2(p+1) interleaved sub-arrays are self-calibrated, but they are not referenced to each other.

The number of calibrated sub-arrays is then reduced to two when the sub-arrays of even and odd elements are separately aligned to each other. The sub-arrays can be tied together by using additional calibration ratios, which must relate elements of different interleaved sub-arrays. The new ratios can be obtained from the mutual coupling measurements when a spacing element of p+1 is used. A minimum of 2(p+1) ratios are needed to tie the sub-arrays, which can be obtained from the mutual coupling measurements in the N−2(p+1) first array elements, that is, $$C'^R_{n,n+2(p_o+1)} = \frac{M'^R_{n,n+p_o+1}(0)}{M'^R_{n+2(p+2),n+p_o+1}(0)}; \quad \begin{array}{l} p_o = p+1 \\ n = 1, 2, 3 \ldots, 2(p+1) \end{array} \quad (10)$$

The ratios for the linear array depicted in FIG. 3 are $C_{1,9}, C_{2,10}, C_{3,11}, C_{4,12}, C_{5,13}$, and $C_{6,14}$. The coefficients $C_{1,9}, C_{3,11}$ and $C_{5,13}$ can be used to tie the first, third and fifth interleaved sub-arrays, while the coefficients $C_{2,10}, C_{4,12}$ and $C_{6,14}$ can tie the second, fourth, and sixth interleaved sub-arrays. This procedure can be realized by using the following expressions $$C_{i,m}(0) = C_{i,m+2(p+1)}(0) \cdot C_{m,m+2(p+1)}(0)^{-1}; \quad i = 1, 2 \quad (11.a)$$

$$C_{i,n}(0) = C_{i,m}(0) \cdot C_{m,n}(0); \quad m = i+2, i+4, i+6, \ldots 2p+i \quad (11.b)$$

$$n = m + 4(p+1), m + 6(p+1), \ldots, 2(p+1)\text{floor}\left(\frac{N-m}{2(p+1)}\right) + m$$

The result is two interleaved calibrated sub-arrays that are not referenced to each other, both consisting of only odd or even elements and referenced to the first element of each sub-array.

Figure 4:
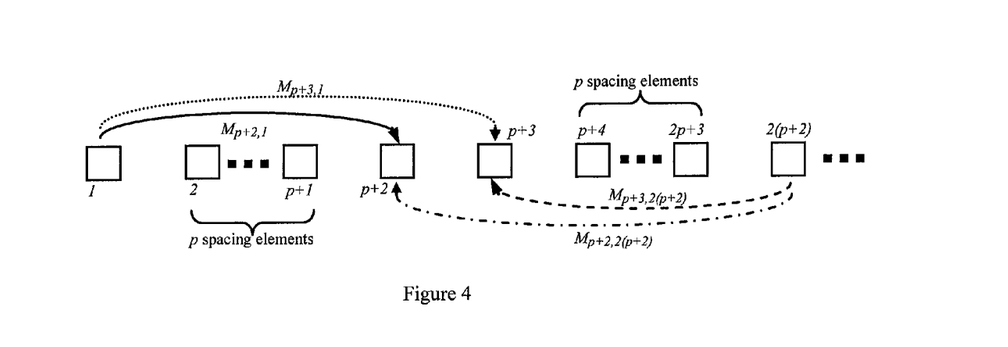
FIG. 4 shows the elements used to resolve the two-array ambiguity.

To complete the overall calibration, the two interleaved sub-arrays are tied together by taking additional mutual coupling measurements. FIG. 4 shows how the measurements can be realized. Since the array is precisely fabricated, geometrically identical pairs of elements have the same free space mutual coupling, that is, $M_{p+2,1}=M_{p+3,2(p+2)}$ and $M_{p+3,1}=M_{p+2,2(p+2)}$. Hence, four separate pair-wise measurements are made by transmitting from the elements 1 and 2(p+2) and receiving both transmissions on the elements p+2 and p+3. The four measurements can be combined as a ratio to obtain, $$C_{p+2,p+3}^{R'}(0) = \pm \sqrt{\frac{M_{p+2,1}'^R(0)M_{p+2,2(p+2)}'^R(0)}{M_{p+3,1}'^R(0)M_{p+3,2(p+2)}'^R(0)}} = \pm \frac{u_{p+2}}{u_{p+3}} \quad (12)$$

This complex calibration ratio ties together the sub-array of even and odd elements. This ratio has a sign ambiguity, which can be solved by predicting the radiation pattern. The far-field radiation pattern will have a null on broadside if the wrong sign is selected. Once all transfer functions have been measured, the even elements can be referenced to the first odd element by using the following expression, $$C_{1,n}'^R(0) = \frac{C_{1,p+(5-k)/2}'^R(0)C_{p+2,p+3}'^R(0)^k}{C_{2,p+(5+k)/2}'^R(0)} C_{2,n}'^R(0); \quad k = \begin{cases} -1, \text{ for even } p \\ 1, \text{ for odd } p \end{cases} \quad (13)$$
$$n = 4, 6, 8, \ldots$$

The results can be used in (5) to determine the complex states to be set in the T/R modules in the receive mode. The calibration in the transmit mode is the same as was described for the receive mode, except that the words "transmit" and "receive" are interchanged.

Test Array Description

The technique was tested in a planar electromagnetic (EM) simulator (Ansoft Designer® available from ANSYS, Inc. of Cannonsburg, Pa. 15317) using an 8×8 element linear array, having 8 column sub-arrays of 8 elements. Each sub-array contained intentional random amplitude and phase errors in the feed. The maximum number of realizable spacing elements of this particular array is 2 (p=0 to p=1). In addition, to validate the technique in large numbers of realizable spacing elements, a 1×32 element microstrip patch linear array antenna with intentional errors in the feed was simulated. Calibrations with eight different spacing elements are realizable in this array (p=0 to p=7). The measurements of mutual coupling in both arrays were obtained from the coupling coefficients of the simulated S-parameter matrix, $M'_{m,n}(0)=S(m,n)$. Because the array antenna is passive, the hardware differences for transmit and receive modes are the same, but the implementable calibration ratios are completely different if different excitation functions are used in each mode.

Results

Figure 5:
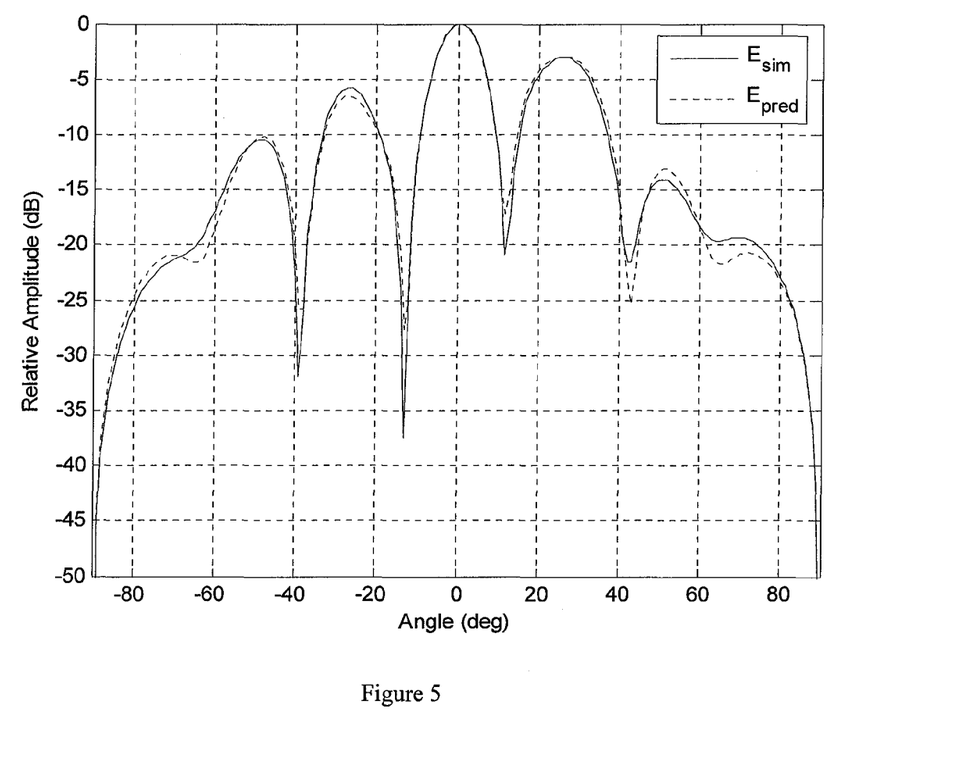
FIG. 5 shows simulated and predicted patterns for an un-calibrated array.
Figure 6:
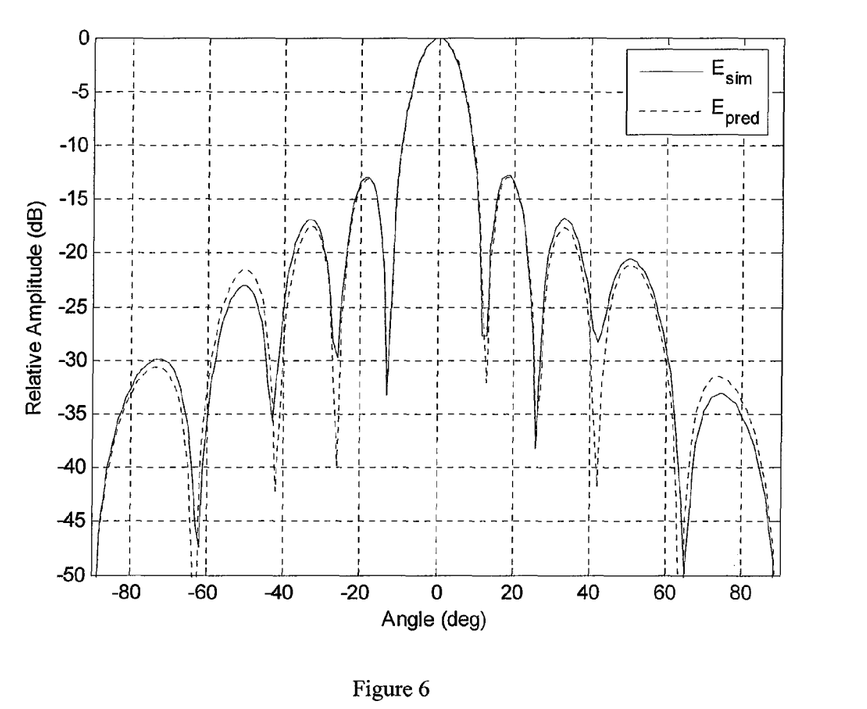
FIG. 6 shows simulated and predicted patterns for a −30 dB Chebyshev distribution and one spacing element.
Figure 7:
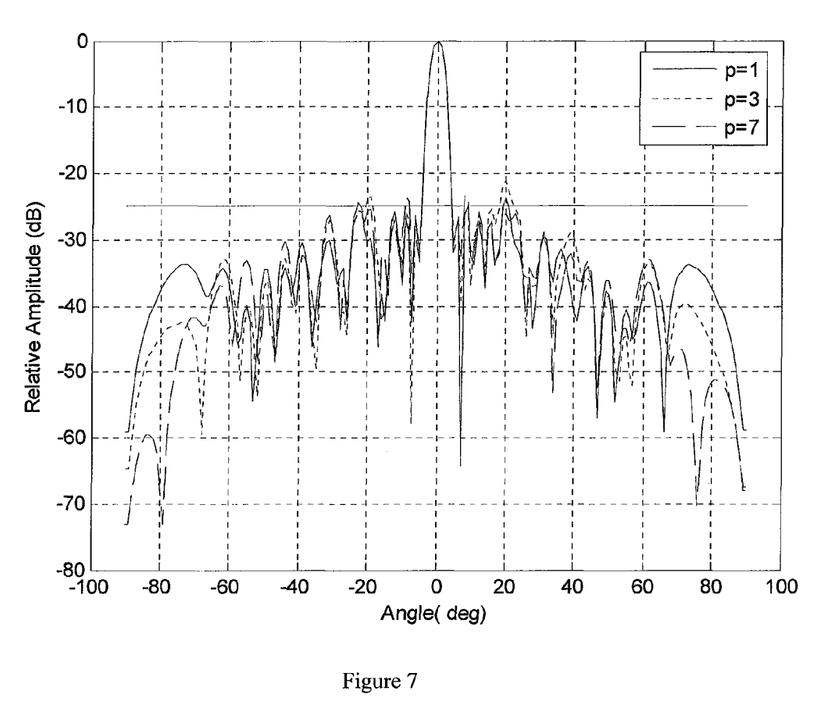
FIG. 7 shows radiation patterns for a 32-element calibrated linear array with three different spacing elements and a −25 dB Taylor distribution.

The linear array of 8 columns of 8 elements was simulated in a 2.5D EM simulator (Ansoft Designer®). The obtained coupling coefficients were used in (5) to calculate the calibration ratios and the excitation function; these results are later used to predict the array far-field radiation pattern without calibration. FIG. 5 shows a good agreement between the simulated and predicted array far-field radiation pattern, the results also show how the hardware differences degrade the sidelobe levels and affect the beam position. Once the calibration ratios are determined, the array can be calibrated in both transmit and receive modes. FIG. 6 shows an azimuth pattern for a −30 dB Chebyshev distribution: a very good match is obtained for the main lobe and the sidelobes. To test the efficiency of this technique in large numbers of spacing elements, a 1×32 microstrip linear array with excitation errors was simulated. The obtained mutual coupling matrix was used to calculate the calibration rations for eight different numbers of spacing elements (p=0 to p=7). FIG. 7 shows the simulated radiation patterns after the alignment and calibration of the array with a 25 dB Taylor weighting and using three different spacing elements (p=1, p=3 and p='7). The radiation patterns are almost the same as are expected in a calibrated array, while the sidelobe level is −25 dB in the three cases indicating the errors due the calibration technique are tolerable in this array.

Figure 8:
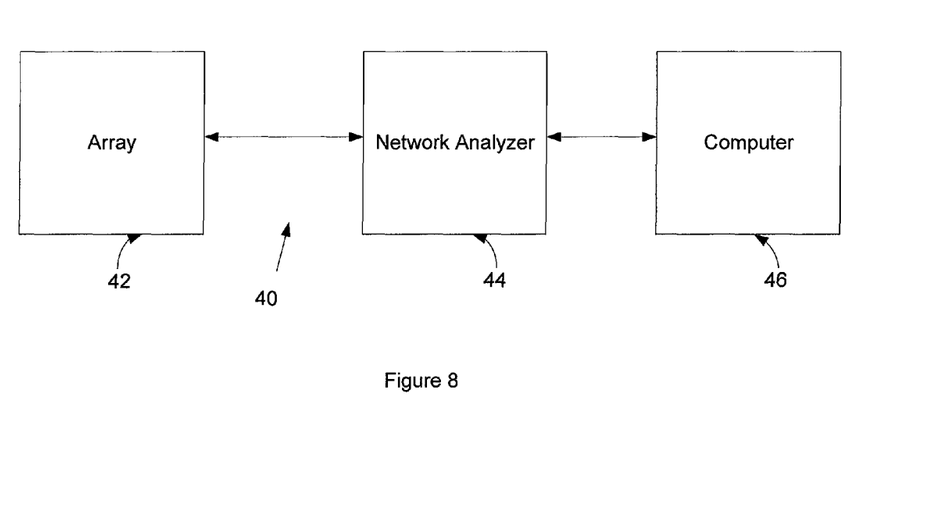
FIG. 8 is a schematic diagram of a system for accomplishing the calibrations.

FIG. 8 shows a system that can be used to accomplish the method. System 40 for calibrating array 42 comprises network analyzer 44 that sends, receives and analyzes test signals, and computer 46 that controls network analyzer 44 and is used to make the necessary calculations.

Non-Linear Arrays

The calibrations can also be performed on non-linear arrays, including square, rectangular, rhombic and parallelogram arrays, for example. Square and rectangular arrays can be calibrated by separately calibrating each row and one column of the array. Rhombic and parallelogram arrays can be calibrated in similar manners, as would be apparent to those of skill in the field, via separate calibration of diagonal rows of regularly-spaced elements.

Other embodiments will occur to those skilled in the art and are within the scope of the claims.

What is claimed is:

1. A method for calibrating array elements of a phased array antenna, comprising:
   (i) transmitting a signal from a transmitting element, and sequentially receiving the transmitted signal at two receiving elements each spaced a first distance from the transmitting element;
   (ii) repeating step (i) one or more times, transmitting from a different transmitting element in each repetition of step (i), until each element being calibrated has received at least one transmission;
   (iii) changing the first distance to a second distance and repeating steps (i) and (ii) at this second distance for at least some of the elements;
   (iv) determining from the received signals of steps (i), (ii) and (iii) two element mutual coupling ratios, one ratio for one subset of the elements being calibrated and the other for a second subset comprising the remaining elements being calibrated;
   (v) making at least four additional transmissions and receptions via two transmissions each from two transmitting elements comprising one element of each subset, and the reception of transmissions from each of these two transmitting elements by each of two receiving elements, the two receiving elements being different elements than the two transmitting elements; and
   (vi) determining from the received signals of step (v) a complex calibration ratio for all of the elements being calibrated with respect to a single element.

2. The method of claim 1 wherein the elements are regularly spaced.

3. The method of claim 2 wherein the first distance is at least twice the distance between elements.

4. The method of claim 3 wherein the second distance is at least three times the distance between elements.

5. The method of claim 4 wherein the first distance is three times the distance between elements and the second distance is four times the distance between elements.

6. The method of claim 2 wherein the first distance is less than the second distance.

7. The method of claim 6 wherein the second distance is greater than the first distance by the amount of the distance between elements.

8. The method of claim 1 wherein there are p spacing elements between the transmitting element and the receiving elements, and step (iii) comprises at least 2(p+1) transmissions and receptions.

9. The method of claim 1 wherein the antenna comprises a two-dimensional lattice of elements.

10. The method of claim 9 wherein the lattice orientation is either square, rectangular, rhombic or parallelogram.

11. The method of claim 9 wherein the elements being calibrated comprise a linear sub-array.

12. The method of claim 11 further comprising separately conducting the method of claim 1 on a plurality of sub-arrays that together include each active element of the two-dimensional lattice.

13. The method of claim 1 further comprising:
(vii) sequentially transmitting a signal from two transmitting elements each spaced a first distance from a receiving element that receives the two transmitted signals;
(viii) repeating step (vii) one or more times, receiving at a different receiving element in each repetition of step (vii), until each element being calibrated has transmitted at least once;
(ix) changing the first distance to a second distance and repeating steps (vii) and (viii) at this second distance for at least some of the elements;
(x) determining from the transmitted signals of steps (vii), (viii) and (ix) two element mutual coupling ratios, one ratio for one subset of the elements being calibrated and the other for a second subset comprising the remaining elements being calibrated;
(xi) making at least four additional transmissions and receptions via two receptions each by two receiving elements comprising one element of each subset, and the transmission of transmissions from each of two transmitting elements, the two receiving elements being different elements than the two transmitting elements; and
(xii) determining from the transmitted signals of step (xi) a complex calibration ratio for all of the elements being calibrated with respect to a single element.

14. A method for calibrating regularly-spaced array elements of a phased array antenna that comprises a two-dimensional lattice of elements, wherein the lattice orientation is either square, rectangular, rhombic or parallelogram, the method comprising:
(i) transmitting a signal from a transmitting element, and sequentially receiving the transmitted signal at two receiving elements each spaced a first distance from the transmitting element, wherein the first distance is at least twice the distance between elements;
(ii) repeating step (i) one or more times, transmitting from a different transmitting element in each repetition of step (i), until each element being calibrated has received at least one transmission;
(iii) changing the first distance to a second distance and repeating steps (i) and (ii) at this second distance for at least some of the elements, wherein the second distance is greater than the first distance and is at least three times the distance between elements, wherein there are p spacing elements between the transmitting element and the receiving elements, and step (iii) comprises at least 2(p+1) transmissions and receptions;
(iv) determining from the received signals of steps (i), (ii) and (iii) two element mutual coupling ratios, one ratio for one subset of the elements being calibrated and the other for a second subset comprising the remaining elements being calibrated;
(v) making at least four additional transmissions and receptions via two transmissions each from two transmitting elements comprising one element of each subset, and the reception of transmissions from each of these two transmitting elements by each of two receiving elements, the two receiving elements being different elements than the two transmitting elements;
(vi) determining from the received signals of step (v) a complex calibration ratio for all of the elements being calibrated with respect to a single element;
(vii) sequentially transmitting a signal from two transmitting elements each spaced a first distance from a receiving element that receives the two transmitted signals;
(viii) repeating step (vii) one or more times, receiving at a different receiving element in each repetition of step (vii), until each element being calibrated has transmitted at least once;
(ix) changing the first distance to a second distance and repeating steps (vii) and (viii) at this second distance for at least some of the elements;
(x) determining from the transmitted signals of steps (vii), (viii) and (ix) two element mutual coupling ratios, one ratio for one subset of the elements being calibrated and the other for a second subset comprising the remaining elements being calibrated;
(xi) making at least four additional transmissions and receptions via two receptions each by two receiving elements comprising one element of each subset, and the transmission of transmissions from each of two transmitting elements, the two receiving elements being different elements than the two transmitting elements; and
(xii) determining from the transmitted signals of step (xi) a complex calibration ratio for all of the elements being calibrated with respect to a single element.

15. The method of claim 14 wherein the first distance is three times the distance between elements and the second distance is four times the distance between elements.

16. The method of claim 14 further comprising separately conducting the method of claim 14 on a plurality of sub-arrays that together include each active element of the two-dimensional lattice.

* * * * *